(12) United States Patent
Lee et al.

(10) Patent No.: US 8,264,642 B2
(45) Date of Patent: Sep. 11, 2012

(54) COLOR CHOLESTERIC LIQUID CRYSTAL DISPLAY DEVICES AND FABRICATION METHODS THEREOF

(75) Inventors: Da-Wei Lee, Taoyuan County (TW); Jyh-Wen Shiu, Hsinchu County (TW); Yuan-Chang Liao, Yunlin County (TW); Jen-Chieh Yang, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 945 days.

(21) Appl. No.: 12/268,176

(22) Filed: Nov. 10, 2008

(65) Prior Publication Data
US 2009/0244442 A1 Oct. 1, 2009

(30) Foreign Application Priority Data
Mar. 31, 2008 (TW) ................. 97111653 A

(51) Int. Cl.
*G02F 1/1335* (2006.01)
*G02F 1/1333* (2006.01)
*G02F 1/1339* (2006.01)
(52) U.S. Cl. ............... 349/106; 349/86; 349/156
(58) Field of Classification Search ............ 349/106, 349/86
See application file for complete search history.

(56) References Cited

U.S. PATENT DOCUMENTS

| | | | |
|---|---|---|---|
| 4,090,501 A | 5/1978 | Chaitin | |
| 4,281,902 A | 8/1981 | Kmetz et al. | |
| 4,451,122 A | 5/1984 | Oh et al. | |
| 4,744,639 A * | 5/1988 | Tsuboyama | 349/162 |
| 4,805,188 A | 2/1989 | Parker | |
| 4,834,500 A | 5/1989 | Hilsum et al. | |
| 4,877,307 A | 10/1989 | Kalmanash | |
| 5,096,520 A | 3/1992 | Faris | |
| 5,172,256 A | 12/1992 | Sethofer et al. | |
| 5,189,534 A | 2/1993 | McDonnell et al. | |
| 5,221,982 A | 6/1993 | Faris | |
| 5,268,782 A * | 12/1993 | Wenz et al. | 349/156 |
| 5,399,390 A * | 3/1995 | Akins | 428/1.62 |
| 5,400,610 A | 3/1995 | Macedo | |
| 5,541,745 A | 7/1996 | Fergason | |
| 5,599,412 A | 2/1997 | Faris | |
| 5,692,226 A | 11/1997 | Hall | |
| 5,808,594 A | 9/1998 | Tsuboyama et al. | |
| 5,808,794 A | 9/1998 | Weber et al. | |
| 5,822,021 A | 10/1998 | Johnson et al. | |
| 5,825,451 A | 10/1998 | Ma et al. | |
| 5,933,205 A | 8/1999 | Yamazaki et al. | |
| 5,942,154 A | 8/1999 | Kim et al. | |
| 6,088,159 A | 7/2000 | Weber et al. | |
| 6,285,434 B1 | 9/2001 | Ma et al. | |
| 6,331,884 B1 | 12/2001 | Masazumi et al. | |
| RE37,509 E | 1/2002 | Bradshaw et al. | |
| 6,404,789 B1 | 6/2002 | Kopp et al. | |
| 6,411,635 B1 | 6/2002 | Kopp et al. | |
| 6,416,768 B1 | 7/2002 | Ravaux et al. | |
| 6,424,387 B2 | 7/2002 | Sato et al. | |
| 6,678,297 B2 | 1/2004 | Kopp et al. | |

(Continued)

*Primary Examiner* — Wen-Ying P Chen

(57) ABSTRACT

Single-layered color cholesteric liquid crystal display devices and fabrication methods thereof are provided. The color cholesteric liquid crystal display device includes a first substrate structure having a base and periodic protrusion banks. A second substrate structure is disposed opposite the first substrate structure to enclose the periodic protrusion banks, and divide a plurality of color sub-pixel channels. A plurality of color cholesteric liquid crystals are respectfully filled in each of the color sub-pixel channel, wherein the base and the periodic protrusion banks are made of continuously integral material.

24 Claims, 16 Drawing Sheets

U.S. PATENT DOCUMENTS

| | | |
|---|---|---|
| 6,741,321 B2 | 5/2004 | Jeong et al. |
| 6,761,066 B2 | 7/2004 | Rait |
| 6,821,249 B2 | 11/2004 | Casscells, III et al. |
| 6,833,892 B2 | 12/2004 | Kamijo |
| 6,879,362 B2 | 4/2005 | Kawabata |
| 6,909,478 B2 | 6/2005 | Ichihashi et al. |
| 7,012,365 B2 | 3/2006 | Adachi et al. |
| 7,067,985 B2 | 6/2006 | Adachi |
| 7,106,402 B2 | 9/2006 | Suzuki et al. |
| 2001/0036212 A1 | 11/2001 | Kopp et al. |
| 2002/0047965 A1 | 4/2002 | Suzuki et al. |
| 2002/0093284 A1 | 7/2002 | Adachi et al. |
| 2002/0097357 A1 | 7/2002 | Huang et al. |
| 2002/0130993 A1 | 9/2002 | Ichihashi et al. |
| 2002/0157464 A1 | 10/2002 | Rait |
| 2002/0167630 A1 | 11/2002 | Fujieda et al. |
| 2003/0025865 A1 | 2/2003 | Takatori et al. |
| 2003/0090607 A1 | 5/2003 | Kamijo |
| 2003/0092975 A1 | 5/2003 | Casscells, III et al. |
| 2003/0107538 A1 | 6/2003 | Asao et al. |
| 2003/0137625 A1 | 7/2003 | Okazaki et al. |
| 2003/0137632 A1 | 7/2003 | Kawabata |
| 2003/0154784 A1 | 8/2003 | Rait |
| 2003/0160923 A1 | 8/2003 | Ma |
| 2003/0214617 A1 | 11/2003 | Bierhuizen et al. |
| 2004/0011995 A1 | 1/2004 | Faris |
| 2004/0051445 A1 | 3/2004 | Adachi |
| 2004/0119926 A1 | 6/2004 | Chung |
| 2004/0189167 A1 | 9/2004 | Adachi et al. |
| 2004/0222960 A1 | 11/2004 | Suzuki et al. |
| 2004/0223098 A1 | 11/2004 | Nose et al. |
| 2004/0246221 A1 | 12/2004 | Izumi |
| 2004/0257537 A1 | 12/2004 | Bierhuizen et al. |
| 2005/0068279 A1 | 3/2005 | Hirota et al. |
| 2005/0099575 A1 | 5/2005 | Liang |
| 2006/0050204 A1 | 3/2006 | Kim et al. |
| 2006/0119782 A1 | 6/2006 | Sha et al. |
| 2006/0119936 A1 | 6/2006 | Ockenfuss |
| 2006/0124897 A1 | 6/2006 | Shingai et al. |
| 2006/0158096 A1 | 7/2006 | Adachi et al. |
| 2006/0176257 A1 | 8/2006 | Wang et al. |
| 2006/0176258 A1 | 8/2006 | Sha et al. |
| 2006/0187520 A1 | 8/2006 | Bierhuizen |
| 2006/0262246 A1 | 11/2006 | Stephenson, III |
| 2006/0262247 A1 | 11/2006 | Stephenson, III et al. |
| 2007/0046794 A1 | 3/2007 | He et al. |
| 2007/0047037 A1 | 3/2007 | Yoshizawa et al. |
| 2008/0252821 A1* | 10/2008 | Liao et al. .................. 349/86 |

* cited by examiner

COLOR CHOLESTERIC LIQUID CRYSTAL DISPLAY DEVICES AND FABRICATION METHODS THEREOF

CROSS REFERENCE TO RELATED APPLICATIONS

This application is based upon and claims the benefit of priority from a prior Taiwanese Patent Application No. 097111653, filed on Mar. 31, 2008, the entire contents of which are incorporated herein by reference.

BACKGROUND OF THE INVENTION

1. Field of the Invention

The invention relates to liquid crystal display (LCD) devices, and in particular to single layer color cholesteric liquid crystal display devices and fabrication methods thereof.

2. Description of the Related Art

Liquid crystal display (LCD) devices have many advantages such as a smaller size, lighter weight and lower power consumption, and are applicable in a variety of electronic and communication devices including notebook computers, personal digital assistants (PDA), mobile phones and the like due to its lighter weight, thinner profile, and portability. Conventional reflective memorable color liquid crystal display devices are widely applicable in electronic books, electronic papers, and the likes. The structures and fabrication methods of conventional cholesteric liquid crystal display devices use a tri-layered red (R), green (G), and blue (B) pixel stacked structure corresponding to various different driving methods. However, stacking tri-layered R, G, and B pixels may result in optical aberration and misalignment during fabrication. Moreover, the tri-layered R, G, and B liquid crystal layer stacked structure are so complicated that layout of electrodes is difficult to design and an LCD panel using the stacked structure has a rigid port, resulting in an intricate fabrication process and high fabrication costs.

Accordingly, the use of single layer color cholesteric liquid crystal display devices and fabrication methods thereof can effectively ameliorate optical aberration, simplify the fabrication process, and reduce fabrication costs. Particularly, the device is applicable to the field of color flexible LCD devices. U.S. Pat. No. 5,825,451, the entirety of which is hereby incorporated by reference, discloses a single layer color cholesteric LCD device using a combination of light decomposable/polymerizable chiral agents and a single layer cholesteric LC structure. The single layer color cholesteric LCD device is illuminated by a UV light disrupting or reducing contents of chiral agent at a single region to achieve colorizing of a single layer cholesteric LCD device. However, the single layer color cholesteric LCD device is easily affected by ambient light deteriorating display stability thereof.

U.S. Pat. No. 6,741,321, the entirety of which is hereby incorporated by reference, discloses an LCD device using a single LC layer and a double substrate assembly process. Different color LC materials are respectively injected into LC channels during fabrication. However, the single layer LCD assembly is not sealed enough such that overflow occurs between the adjacent LC channels resulting in color mixing and color saturation.

FIG. 1A is a cross section of a conventional single layer color cholesteric LCD device. Referring to FIG. 1A, a conventional single layer color cholesteric LCD panel 2 includes a lower substrate 6 and an upper substrate 12 opposed to each other and with a gap therebetween. An enclosed structure 8 is interposed between the lower substrate 6 and the upper substrate 12, dividing a plurality of stripe color sub-pixel LC channels. A first electrode 4 and an alignment layer 14 are disposed on the lower substrate 6. A second electrode 10 and an alignment layer 14 are disposed on the upper substrate 12. The first electrode 4 and the second electrode 10 are substantially perpendicular to each other.

FIG. 1B is a schematic view of the lower substrate of the conventional single layer color cholesteric LCD device of FIG. 1A. In FIG. 1B, the enclosed structure 8 divides a plurality of (R, G, B) stripe color sub-pixel LC channels $C_R$, $C_G$, and $C_B$. Perpendicularly crossed segments 16 and 18 are disposed on one end of the LC channels $C_G$ and $C_B$ to seal the LC channels. After the lower substrate 6 and upper substrate 12 are assembled, the second end $L_2$ of the enclosed structure 8 are sealed by a sealant enclosing the LC channels $C_G$ and $C_B$, while the first end $L_1$ of the LC channels $C_R$ remains opened to serve as an LC injection opening. Each of the LC channels $C_R$, $C_G$, and $C_B$ is sequentially injected with respective color LCs and sealed. Before filling each of the single layer color LC channels, however, conventional methods require sealing of the second end of the enclosed structure. Furthermore, when separately injecting LC into the LC channels, different color LCs may overflow to adjacent LC channels and mix, thus resulting in color mixing and color saturation.

BRIEF SUMMARY OF THE INVENTION

The features and aspects of the invention are related to single layer color cholesteric liquid crystal display devices and fabrication methods thereof. A bank portion and a base portion of the first substrate are optionally designed as a continuous unified structure, creating different length liquid crystal (LC) channels. An adhesion layer is optionally formed on another opposing substrate or the bank portion. The two opposing substrate are assembled. The assembled structure is sequentially cut, injected red, green, and blue LC, and sealed to prevent color mixing and reduce color saturation.

Embodiments of the invention provide a color cholesteric liquid crystal display device, comprising: a first substrate with a base portion and a periodic protruding bank portion; a second substrate opposing the first substrate to create a plurality of color sub-pixel channels; and a plurality of color cholesteric liquid crystals respectively filled in each of the color sub-pixel channels, wherein the base portion and the periodic protruding bank portion are a continuous unified structure.

Embodiments of the invention also provide a fabrication method for a color cholesteric liquid crystal display device, comprising: providing a first substrate; forming a patterning mask layer on the first substrate; etching the first substrate to create a base portion and a periodic protruding bank portion; forming a first conductive layer on the first substrate; removing the mask layer and the first conductive layer thereon, leaving a first electrode on the base portion along a first direction; providing a second substrate with a second electrode along a second direction; assembling the first substrate and the second substrate to adhere the periodic protruding bank portion to the second substrate and divide a plurality of color sub-pixel channels; and sequentially injecting a plurality of color cholesteric liquid crystals in the corresponding color sub-pixel channels and sealing each of the color sub-pixel channels with a sealant material.

Embodiments of the invention further provide a fabrication method for a color cholesteric liquid crystal display device, comprising: providing a first substrate; forming a thin-film layer on the first substrate; imprinting the first substrate with a template to create a base portion and a periodic protruding bank portion; depositing a first conductive layer on the first substrate; removing the thin-film layer on the bank portion and the first conductive layer on the thin-film layer, leaving a first electrode on the base portion along a first direction; providing a second substrate with a second electrode along a second direction; assembling the first substrate and the second substrate to adhere the periodic protruding bank portion to the second substrate and divide a plurality of color sub-pixel channels; and sequentially injecting a plurality of color cholesteric liquid crystals in the corresponding color sub-pixel channels and sealing each of the color sub-pixel channels with a sealant material.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
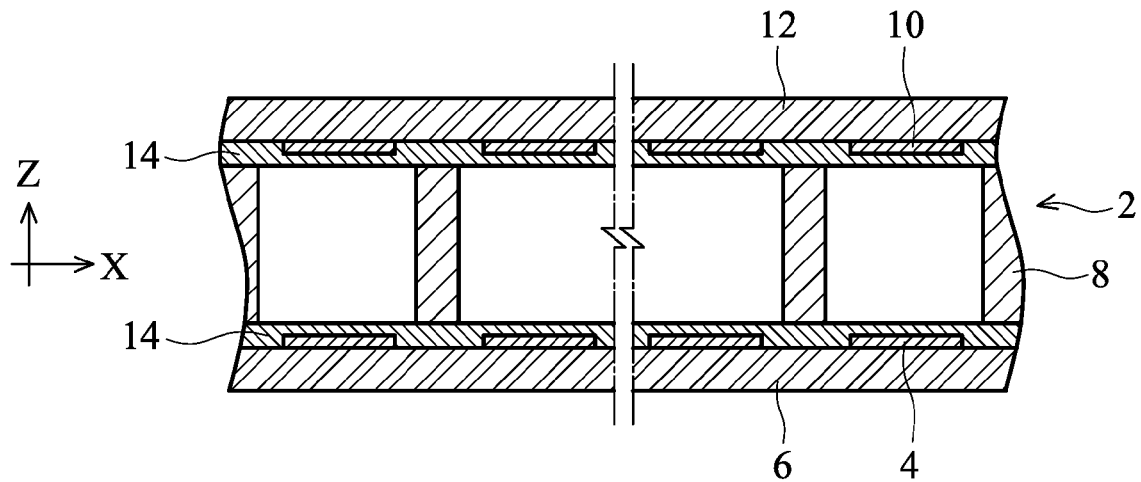
FIG. 1A is a cross section of a conventional single layer color cholesteric LCD device.
Figure 1B:
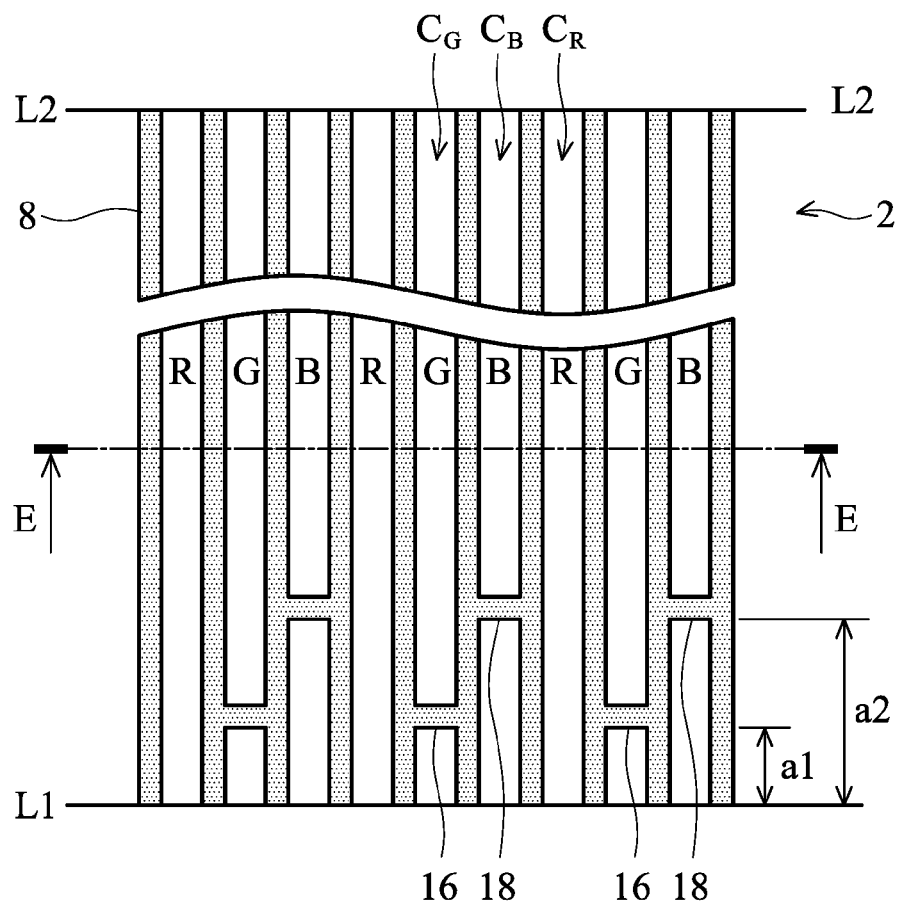
FIG. 1B is a schematic view of the lower substrate of the conventional single layer color cholesteric LCD device of FIG. 1A.
Figure 2A:
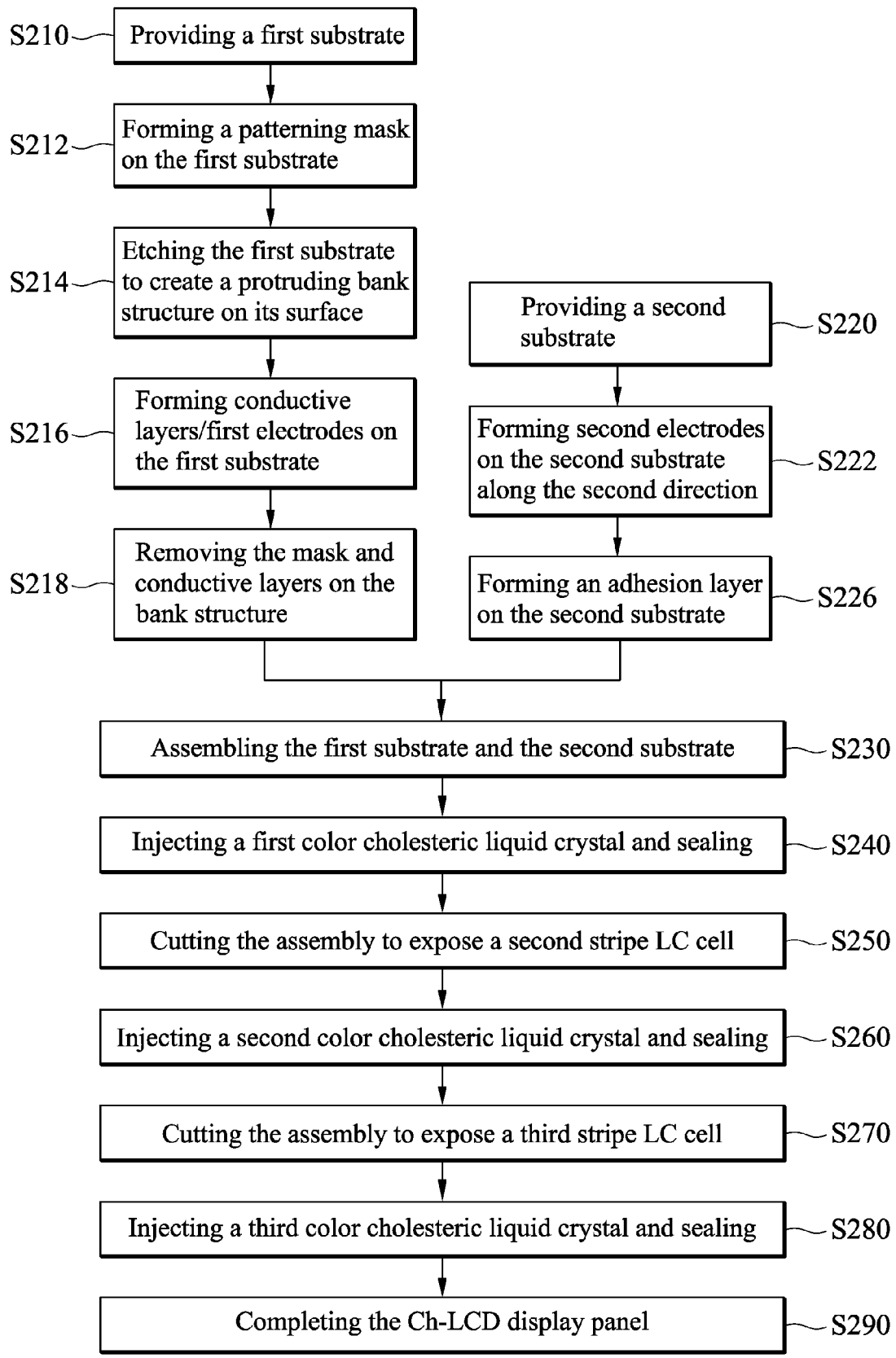
FIG. 2A is a flowchart illustrating an exemplary embodiment of a fabrication method for a single layer color cholesteric LCD device according to the invention.

FIG. 2A is a flowchart illustrating an exemplary embodiment of a fabrication method for a single layer color cholesteric LCD device according to the invention. Referring to FIG. 2A, preparation of a first substrate structure (such as a lower substrate structure) is initially performed including providing a first substrate (step S210) and forming a patterning mask on the first substrate (step S212). Subsequently, the first substrate is etched to create a protruding bank structure on the first substrate surface (step S214). For example, the first substrate is etched to create a base portion and periodic protruding bank portions, wherein trenches are divided therebetween. A conductive layer, serving as a first electrode, is blankly formed on the first substrate (step S216). The mask and part of the conductive layer on the bank portion are removed (step S218), thereby leaving a first electrode along a first direction on the first substrate.

Subsequently, preparation of a second substrate structure (such as an upper substrate structure) is performed including providing a second substrate (step S220) and forming a patterned second electrode along the second direction on the second substrate (step S222). An adhesion layer is formed overlying the second substrate (step S226).

The first and second substrate structures are assembled opposed to each other with a gap interposed therebetween (step S230). The patterned bank portions and the adhesion layer are tightly combined to prevent mixtures of color LCs between adjacent LC channels from overflowing. A first color cholesteric LC is filled in a first stripe LC channel and then sealed (step S240). The assembly structure is cut to expose a second stripe LC channel (step S250). A second color cholesteric LC is filled in the second stripe LC channel and then sealed (step S260). The assembly structure is cut to expose a third stripe LC channel (step S270). A third color cholesteric LC is filled in the third stripe LC channel and then sealed (step S280). After all the three color cholesteric LCs are filled and sealed, fabrication of the single layer color cholesteric LCD device is completed (step S290).

Figure 2B:
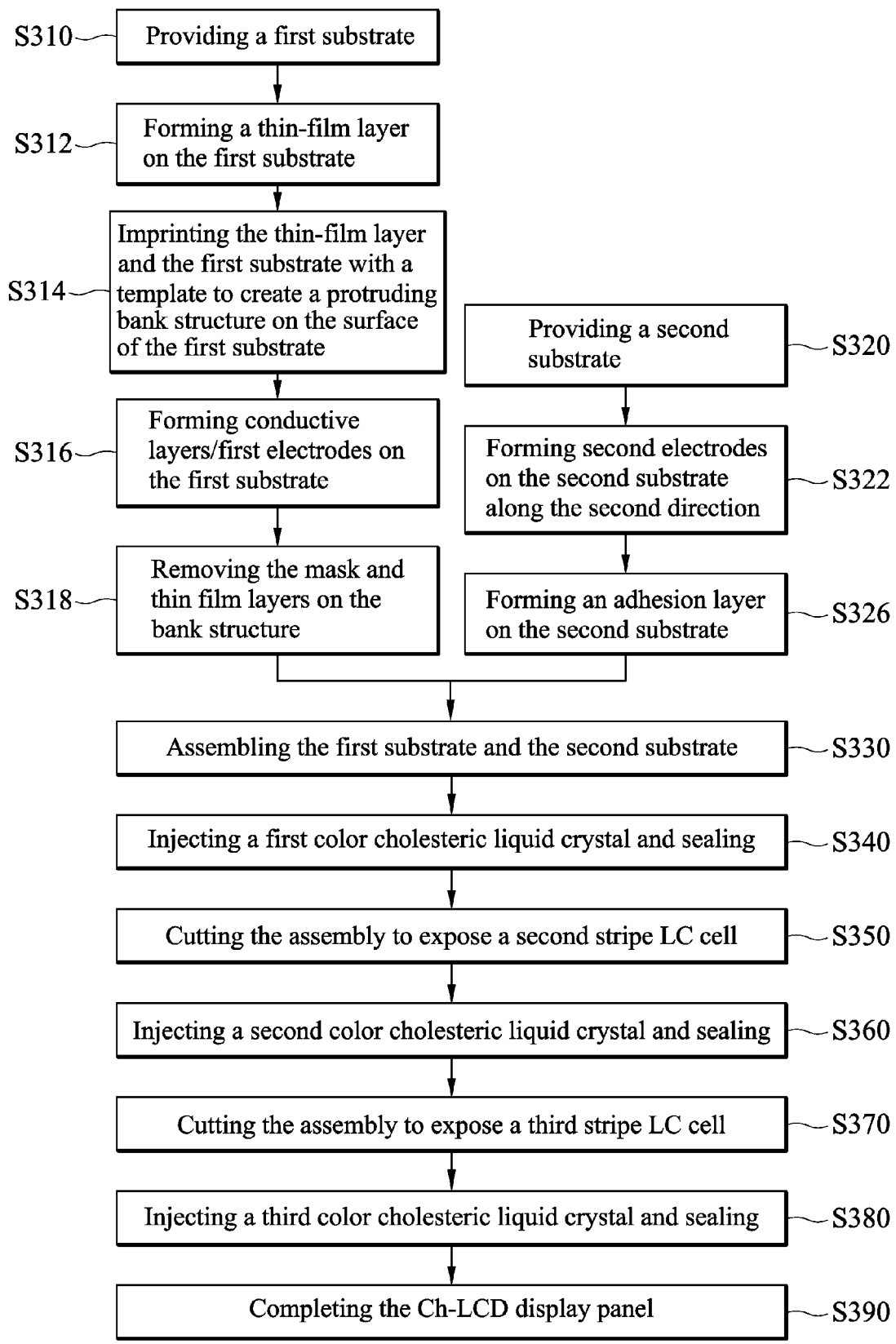
FIG. 2B is a flowchart illustrating another embodiment of a fabrication method for a single layer color cholesteric LCD device according to the invention.

According to another embodiment of the invention, preparation of another first substrate structure (such as a lower substrate structure) is optionally or alternatively performed including providing a first substrate (step S310) and forming a thin-film layer, such as photoresist, on the first substrate (step S312). The thin-film layer and the first substrate are imprinted by a template to create a protruding bank structure on the surface of the first substrate (step S314). The bank structure includes a base portion and a periodic protruding bank portion. Next, a conductive layer, serving as a first electrode, is blankly formed on the first substrate (step S316). The thin film layer and part of the conductive layer on the bank portion are removed (step S318), thereby leaving a first electrode along a first direction on the first substrate, as shown in FIG. 2B. Other fabrication steps (S320-390) are substantially similar to the corresponding steps of the fabrication method of FIG. 2A, and for simplicity, their detailed descriptions are omitted.

According to another embodiment of the invention, if the first substrate is adhesive, formation of the adhesion layer on the second substrate (step S226) can be omitted. The first and second substrate can thus be tightly combined.

Figure 3A:
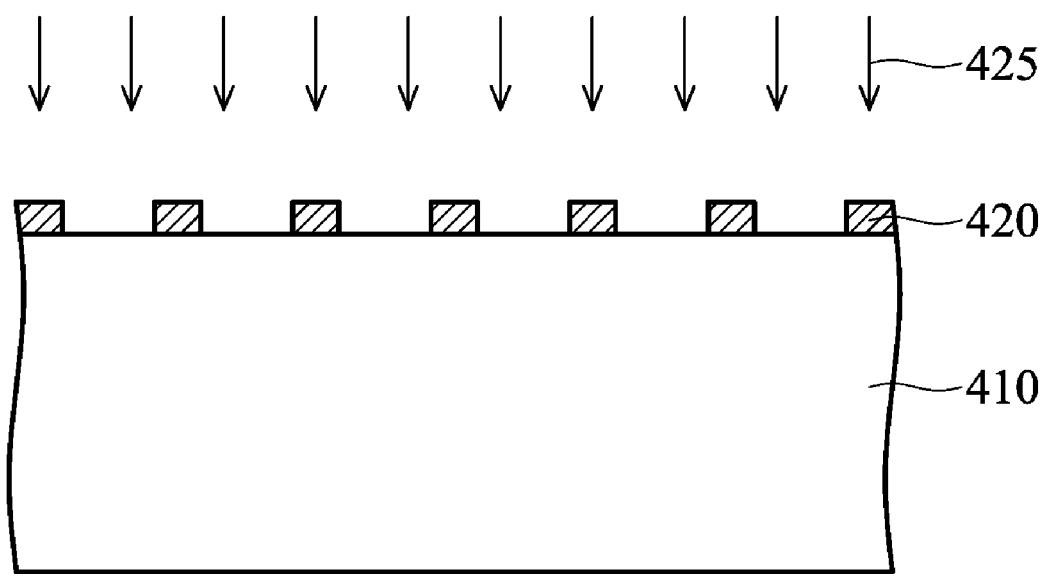
FIGS. 3A-3H are schematic views of an exemplary embodiment of each fabrication method step for a single layer color cholesteric LCD device of the invention.
Figure 3B:
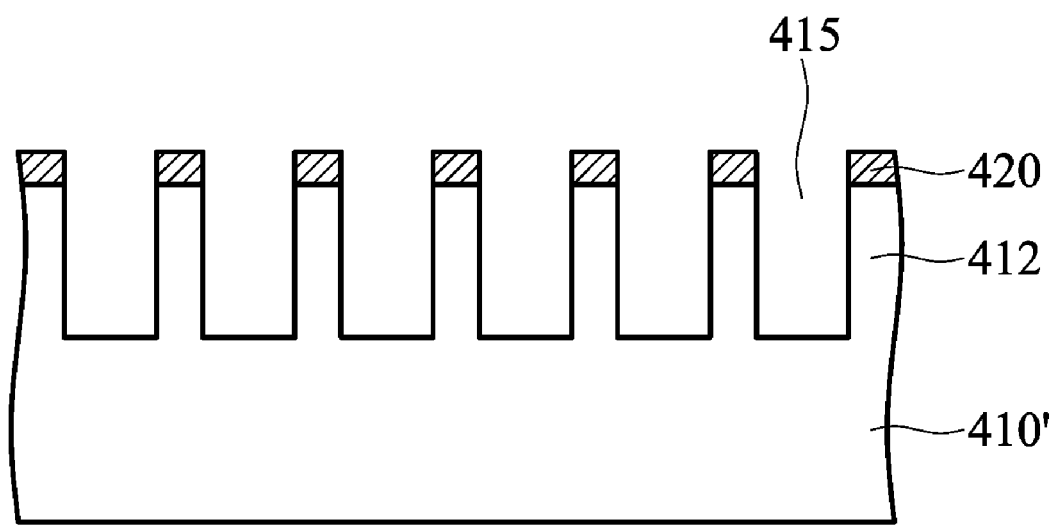

FIGS. 3A-3F are schematic views of an exemplary embodiment of each fabrication method step for a single layer color cholesteric LCD device of the invention. Referring to FIG. 3A, a first substrate 410 is provided. A patterned mask layer 420 is formed on the first substrate 410. For example, a patterned photoresist is lithographically formed on the first substrate. Subsequently, an etching step 425 is performed. By using the patterned mask layer 420 as an etching mask, the first substrate is etched comprising a base portion 410' and periodic protruding bank portions 412. The periodic protruding bank portions 412 can be composed of trenches 415 to serve as liquid crystal channels, as shown in FIG. 3B. The first substrate can be made of rigid substrates or flexible substrates. For example, the flexible substrates comprise polycarbonate (PC) substrates, polyethersulfone (PES) substrates, polyethylene terephthalate (PET) substrates, and polyimide (PI) substrates. Circuitry components such as thin film transistors (TFTs) and capacitors to control pixel electrodes can be optionally formed on the first substrate.

Figure 3C:
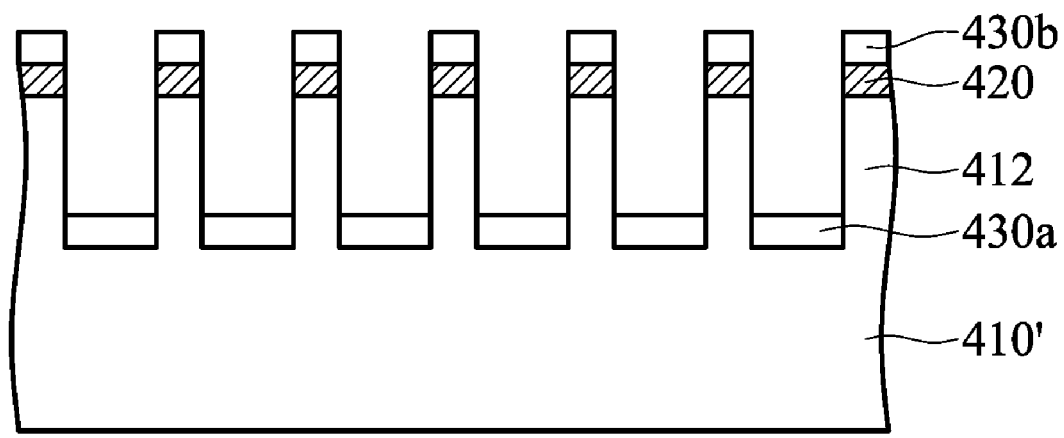
Figure 3D:
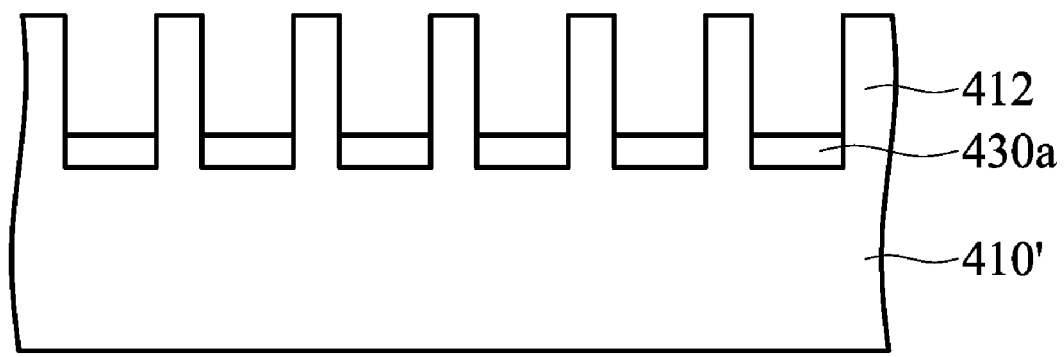

Next, referring to FIG. 3C, a first conductive layer is formed on the first substrate, separately deposited on part of the conductive layer 430a on the base portion 410' within the trenches 415 and deposited on part of the conductive layer 430b on the mask layer 420 over the bank portions 412. Subsequently, the patterned mask layer 420 and the overlaid conductive layer 430b are removed, leaving a first electrode along a first direction on the base portion 410', as shown in FIG. 3D.

Figure 3E:
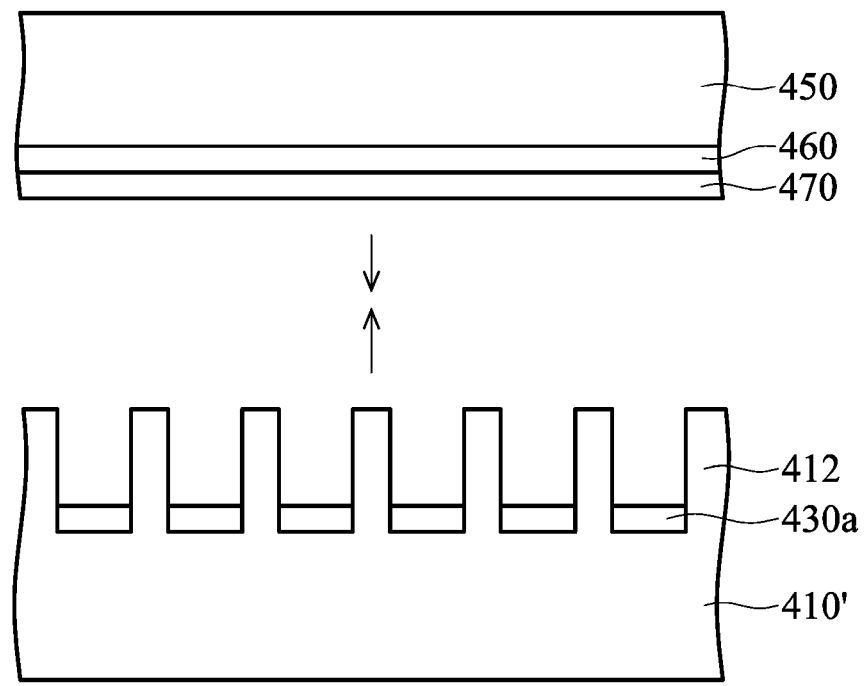

Referring to FIG. 3E, a second substrate 450 with second electrodes 460 along a second direction thereon is provided. Note that the first direction and the second direction are substantially perpendicular to each other, thereby creating a passive matrix pixel array. According to an embodiment of the invention, an adhesion layer 470 can be blankly formed on the second substrate 450. Next, the first substrate and second substrate are assembled opposing each other such that the periodic protruding bank portions 412 and the adhesion layer 470 are tightly combined. A plurality of color sub-pixel channels are thus divided by the periodic protruding bank portions 412. A plurality of color cholesteric liquid crystals are sequentially injected into the corresponding color sub-pixel channels and each of the color sub-pixel channels are sealed with a sealant material.

Figure 3F:
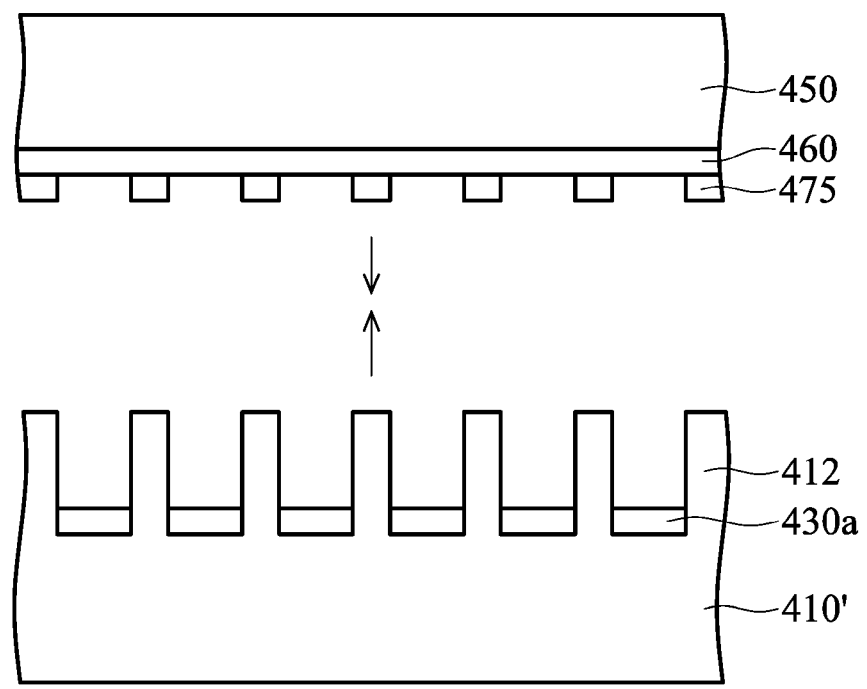
Figure 3G:
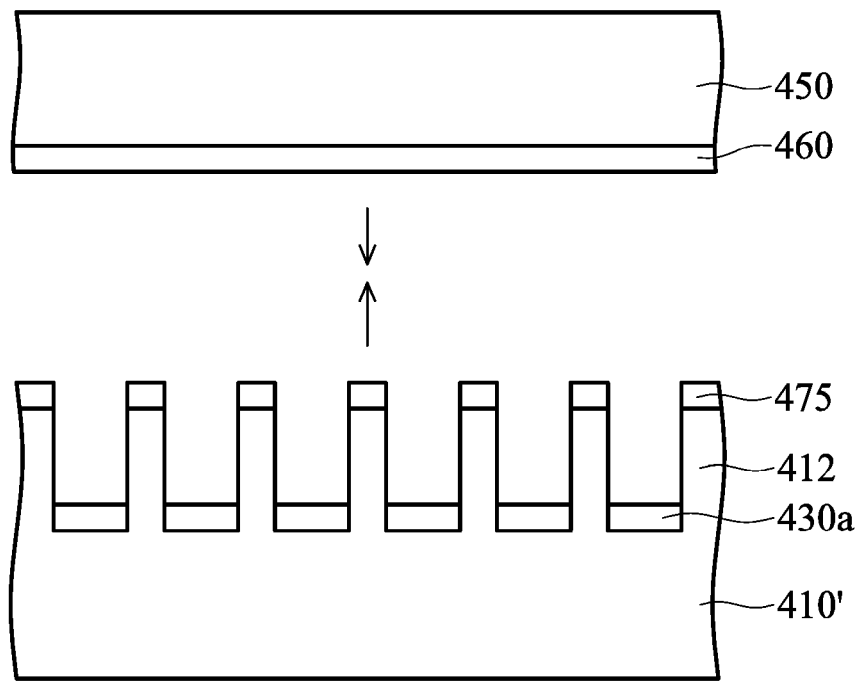

According to another embodiment of the invention, a patterned adhesion layer 475 can be selectively formed on the second substrate 450, as shown in FIG. 3F. The patterned adhesion layer 475 can be made of a glue material or a solidified material. For example, the solidified material comprises a light solidified material or a thermoset material. The thickness of the adhesion layer 475 is less than the thickness (height) of the patterned enclosed structure 412. Further, the adhesion layer is free from the areas corresponding to each of the color sub-pixel channels to reduce driving voltages and to improve contrast ratio. Note that the patterned adhesion layer can be directly formed on the patterned bank portions of the first substrate. By using precisely controlled position and inkjet techniques, the adhesion layer can be directly formed on the corresponding bank portions, as shown in FIG. 3G.

Figure 3H:
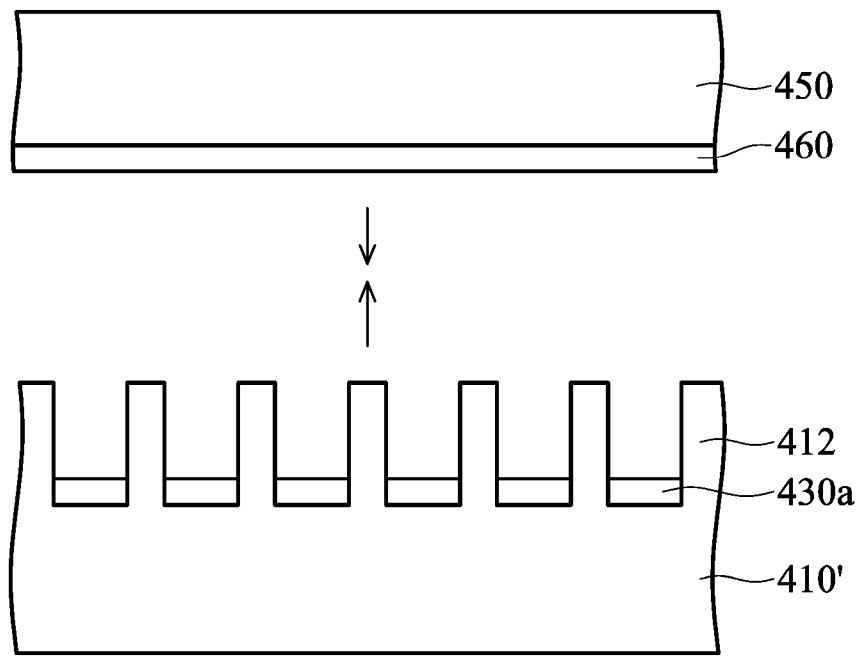

According to another embodiment of the invention, if the first substrate 410 is adhesive, formation of the adhesion layer on the second substrate 450 can be omitted. The bank portions of the first substrate are tightly combined with the second substrate, as shown in FIG. 3H.

Figure 4A:
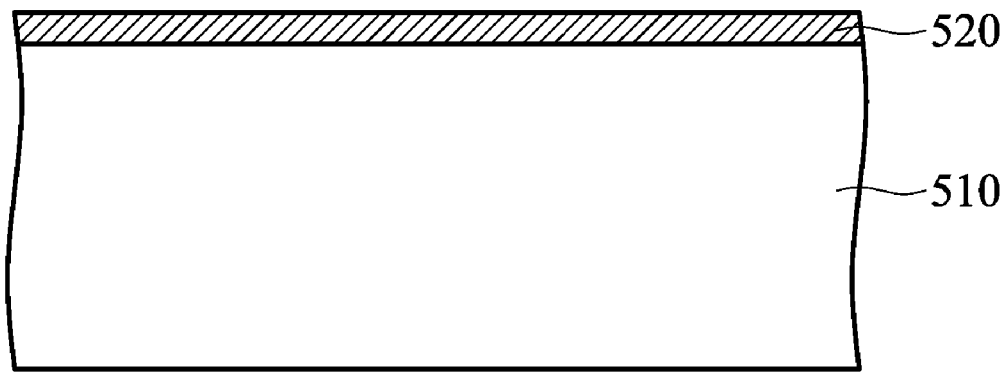
FIGS. 4A-4F are schematic views of another exemplary embodiment of each fabrication method step for a single layer color cholesteric LCD device of the invention.
Figure 4B:
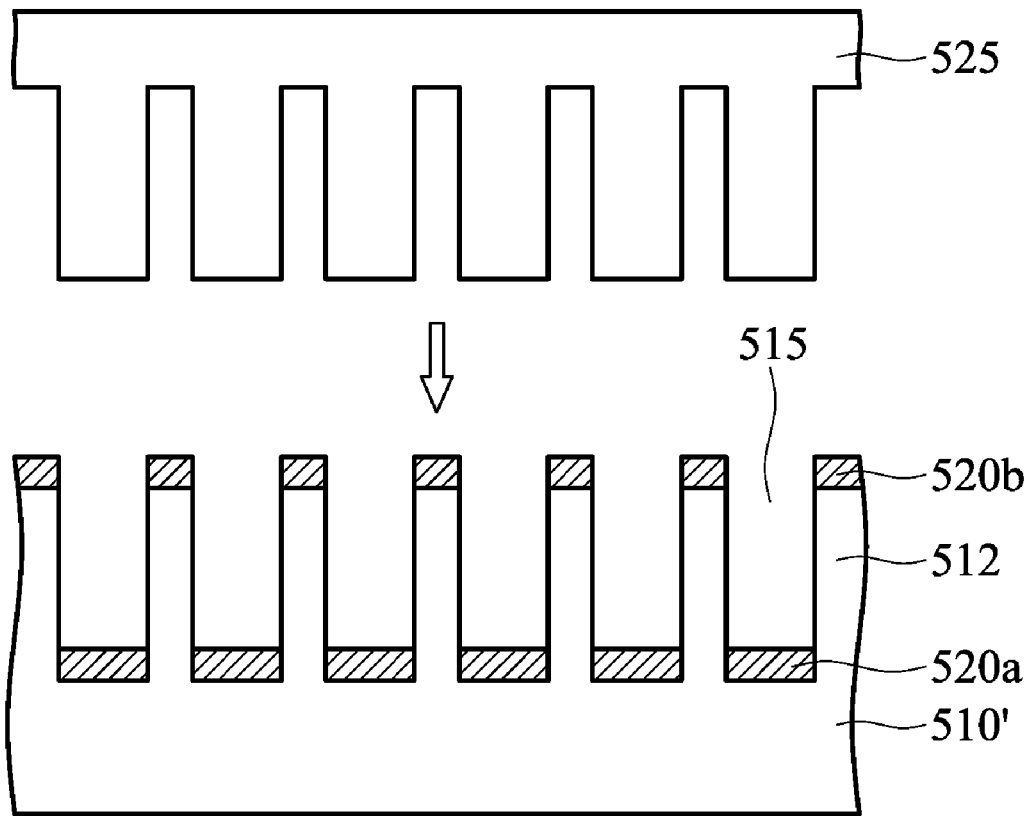

FIGS. 4A-4F are schematic views of another exemplary embodiment of each fabrication method step for a single layer color cholesteric LCD device of the invention. Referring to FIG. 4A, a first substrate 510 is provided. A thin-film layer 520, such as photoresist is formed on the first substrate 510. The thin-film layer 520 and the first substrate 510 are imprinted by a template 525 to create a base portion 510' and periodic protruding bank portions 512. The periodic protruding bank portions 512 can be composed of trenches 515 to serve as liquid crystal channels, as shown in FIG. 4B. The first substrate can be made of rigid substrates or flexible substrates. For example, the flexible substrates comprise polycarbonate (PC) substrates, polyethersulfone (PES) substrates, polyethylene terephthalate (PET) substrates, and polyimide (PI) substrates. Circuitry components such as thin film transistors (TFTs) and capacitors to control pixel electrodes can be optionally formed on the first substrate.

Figure 4C:
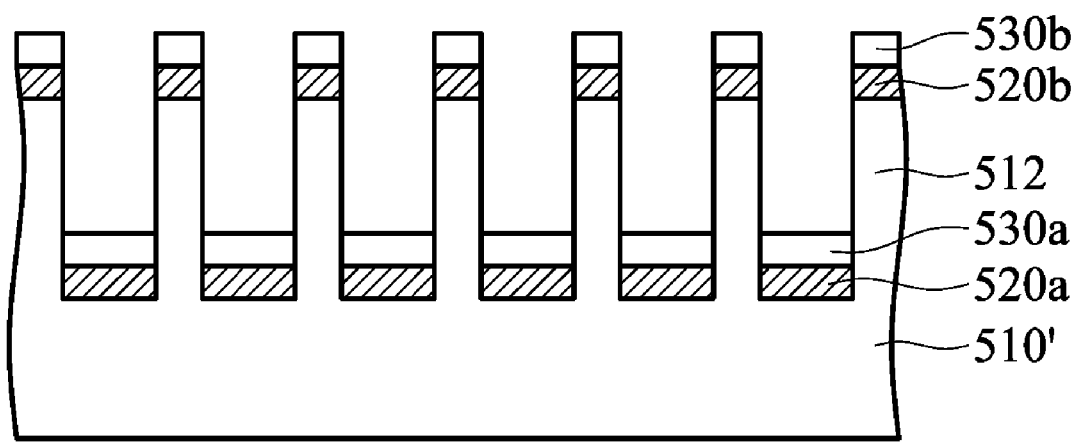
Figure 4D:
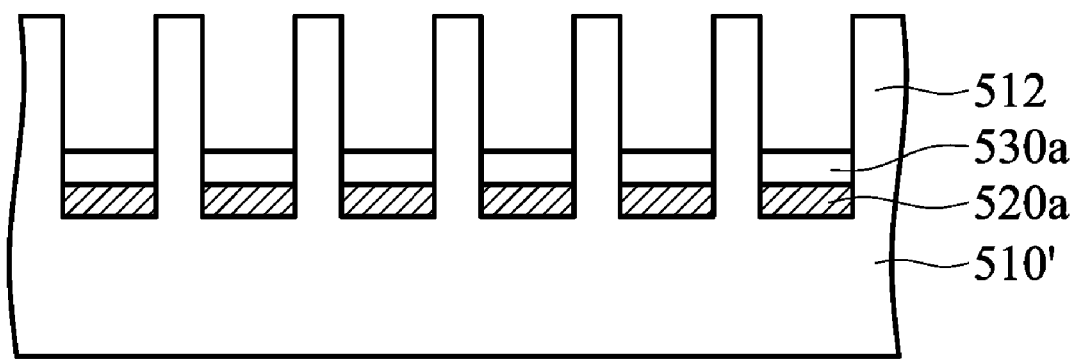

Next, referring to FIG. 4C, a first conductive layer is formed on the first substrate, separately deposited on part of the conductive layer 530a on the base portion 510' within the trenches 515 and deposited on part of the conductive layer 530b on the thin-film layer 520b over the bank portions 512. Subsequently, the thin-film layer 520b and the overlaid conductive layer 530b over the bank portion 512 are removed, leaving a first electrode along a first direction on the base portion 510', as shown in FIG. 4D.

Figure 4E:
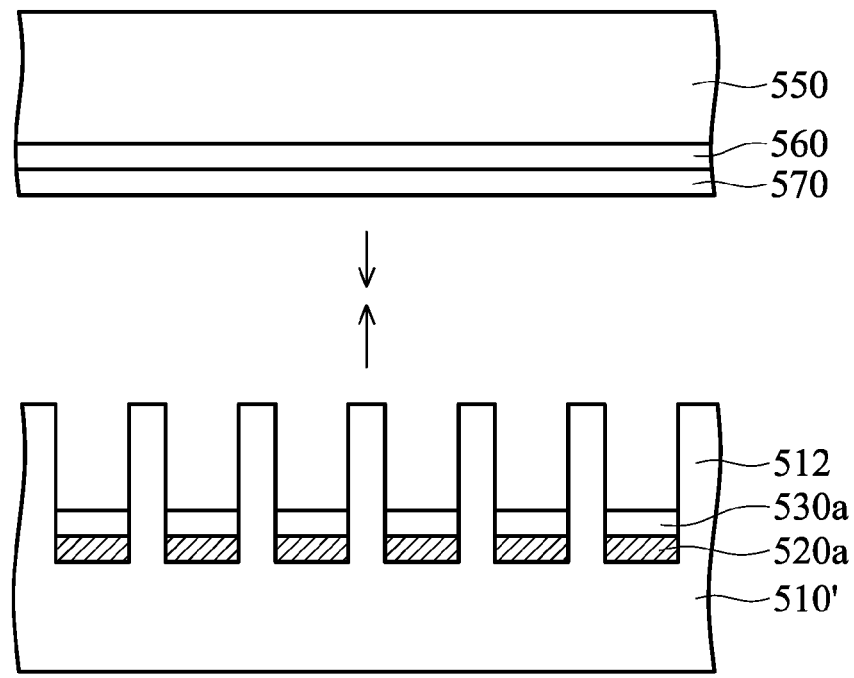

Referring to FIG. 4E, a second substrate 550 with second electrodes 560 along a second direction thereon is provided. Note that the first direction and the second direction are substantially perpendicular to each other, thereby creating a passive matrix pixel array. According to an embodiment of the invention, an adhesion layer 570 can be blankly formed on the second substrate 550. Next, the first substrate 510 and second substrate 550 are assembled opposing each other such that the periodic protruding bank portions 512 and the adhesion layer 570 are tightly combined. A plurality of color sub-pixel channels are thus divided by the periodic protruding bank portions 412. A plurality of color cholesteric liquid crystals are sequentially injected into the corresponding color sub-pixel channels and each of the color sub-pixel channels are sealed with a sealant material.

Figure 4F:
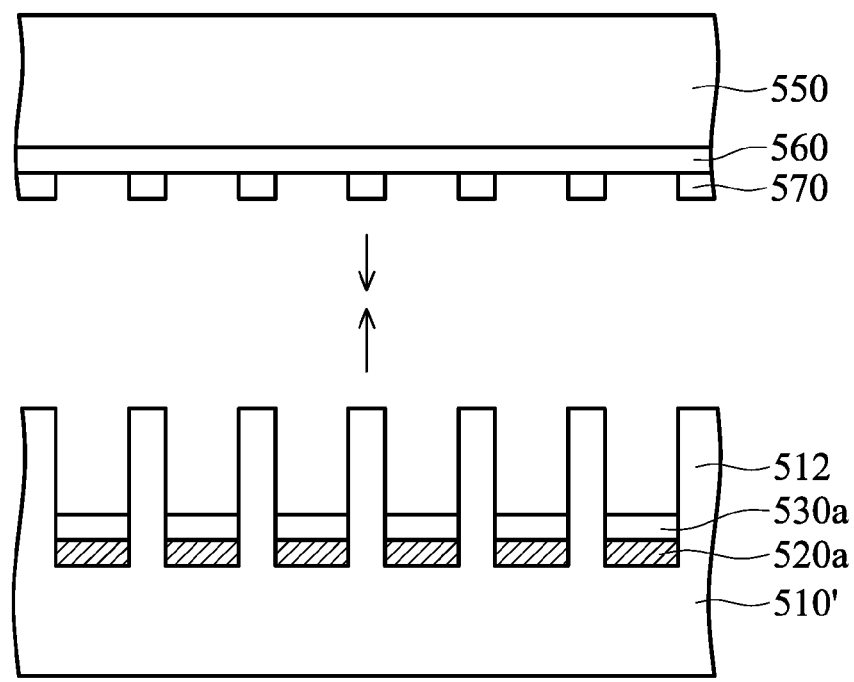

According to another embodiment of the invention, a patterned adhesion layer 575 can be selectively formed on the second substrate 550, as shown in FIG. 4F. The patterned adhesion layer 575 can be made of a glue material or a solidified material. For example, the solidified material comprises a light solidified material or a thermoset material. The thickness of the adhesion layer 575 is less than the thickness (height) of the patterned enclosed structure 512. Further, the adhesion layer is free from the areas corresponding to each of the color sub-pixel channels to reduce driving voltages and to improve contrast ratio. Note that the patterned adhesion layer can be directly formed on the patterned bank portions of the first substrate. By using precisely controlled position and inkjet techniques, the adhesion layer can be directly formed on the corresponding bank portions.

According to another embodiment of the invention, if the first substrate 510 is adhesive, formation of the adhesion layer on the second substrate 550 can be omitted. The bank portions of the first substrate are tightly combined with the second substrate.

Figure 5:
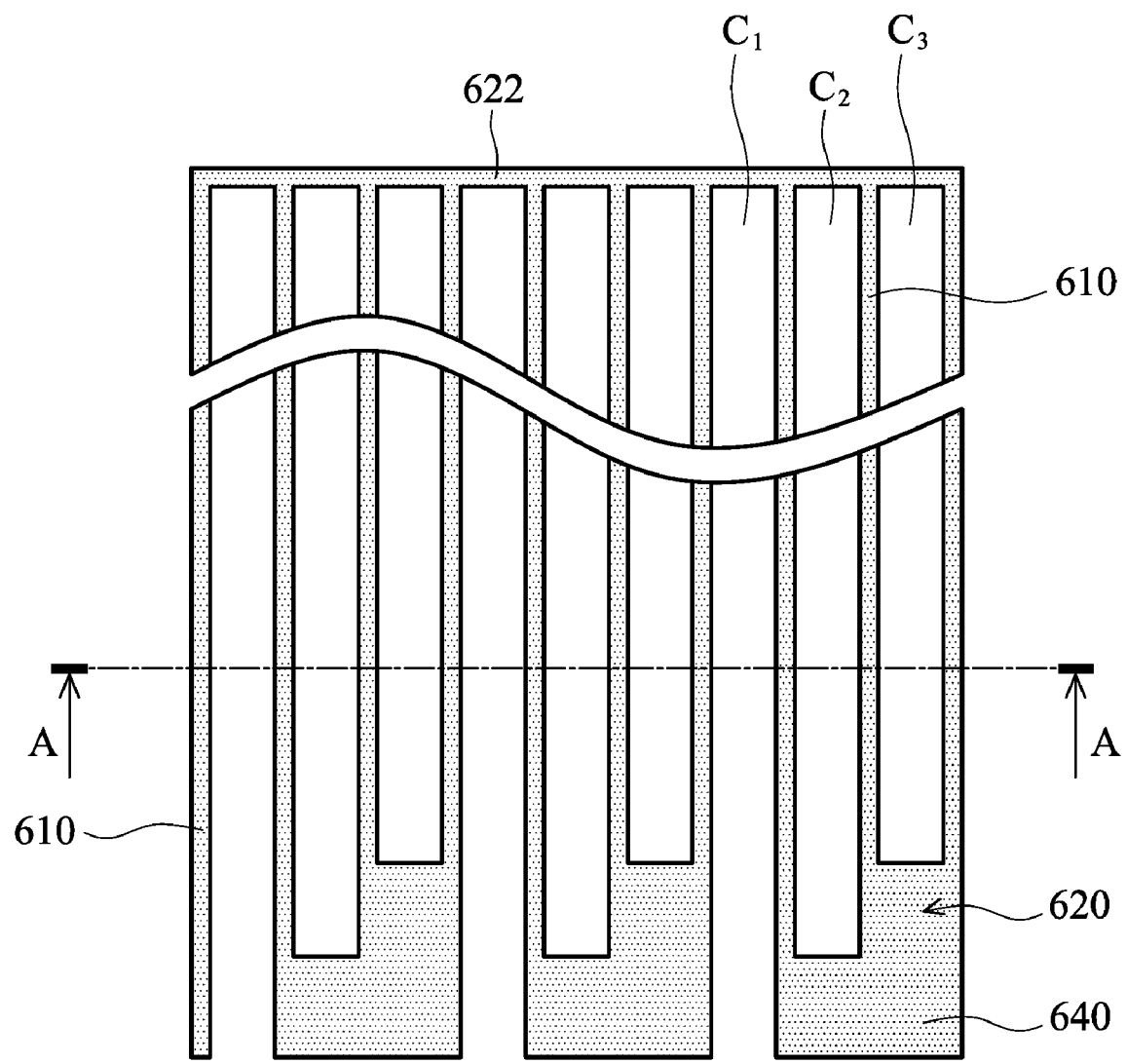
FIG. 5 is a plan view of an embodiment of the enclosed structure of the invention.

FIG. 5 is a plan view of an embodiment of the enclosed structure of the invention. In FIG. 5, a patterned enclosed structure 620 comprises a plurality of stripe wall structures 610. One end of each stripe wall structures 610 connects to and is perpendicular to a straight end line 622 and the other end of the stripe wall structures 610 connects to a bulk region 640, thereby dividing a first LC channel $C_1$ with a first LC injection opening, a second closed LC channel $C_2$, and a third closed LC channel $C_3$. The length of the first LC channel $C_1$ exceeds that of the second LC channel $C_2$, and the length of the second LC channel $C_2$ exceeds that of the third LC channel $C_3$. The bulk region 640 can enhance adhesion between the patterned enclosed structure and the adhesion layer, thereby preventing LC overflow between adjacent LC channels during injection of the color LCs.

Figure 6A:
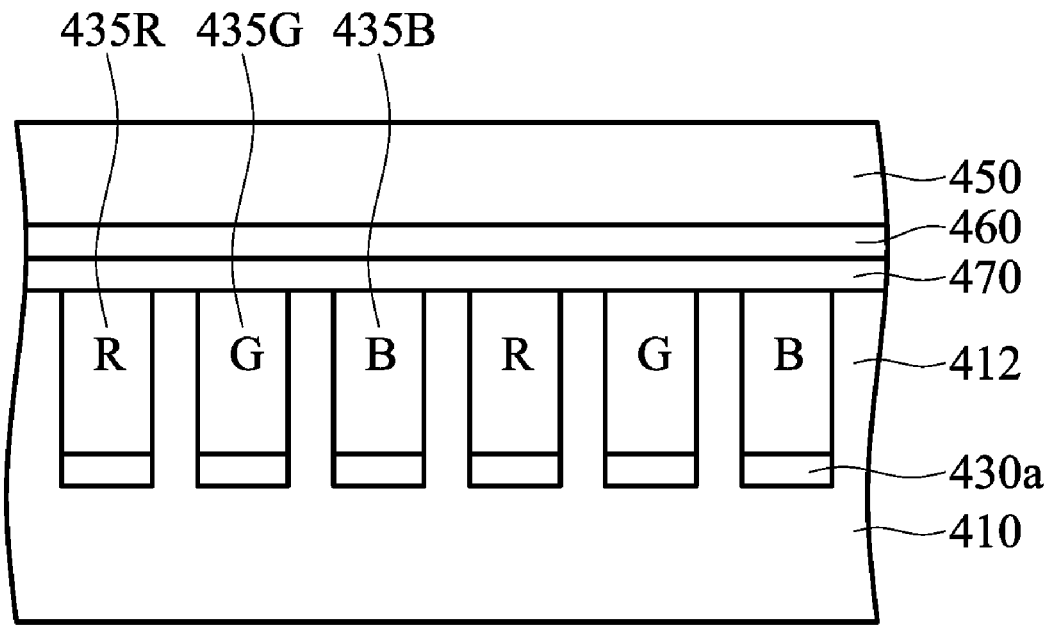
FIGS. 6A-6D are cross sections of several embodiments of the substrate structure assembly filled with liquid crystal.

FIGS. 6A-6D are cross sections of several embodiments of the substrate structure assembly filled with liquid crystal. Referring to FIG. 6A, the combination of the first and second substrate structure which is filled with liquid crystal includes the first substrate 410 and second substrate 450 opposed to each other with a plurality of parallel LC channel for containing the respective color cholesteric LCs interposed therebetween. Each LC channel corresponds to sub-pixel regions 435R, 435G, and 435B of the single layer color cholesteric LCD device. A first electrode 430a such as a pixel electrode along a first direction is disposed on the base portion 410' of the first substrate, and a second electrode 460 such as a common electrode along a second direction is disposed on the second substrate 450, and the first direction and the second direction are substantially perpendicular to each other. An adhesion layer 470 can be optionally disposed between the bank portions 412 of the first substrate and the second substrate 450 such that the adhesion layer is tightly adhered so as to prevent LC overflow between adjacent LC channels during injection of color LCs.

Figure 6B:
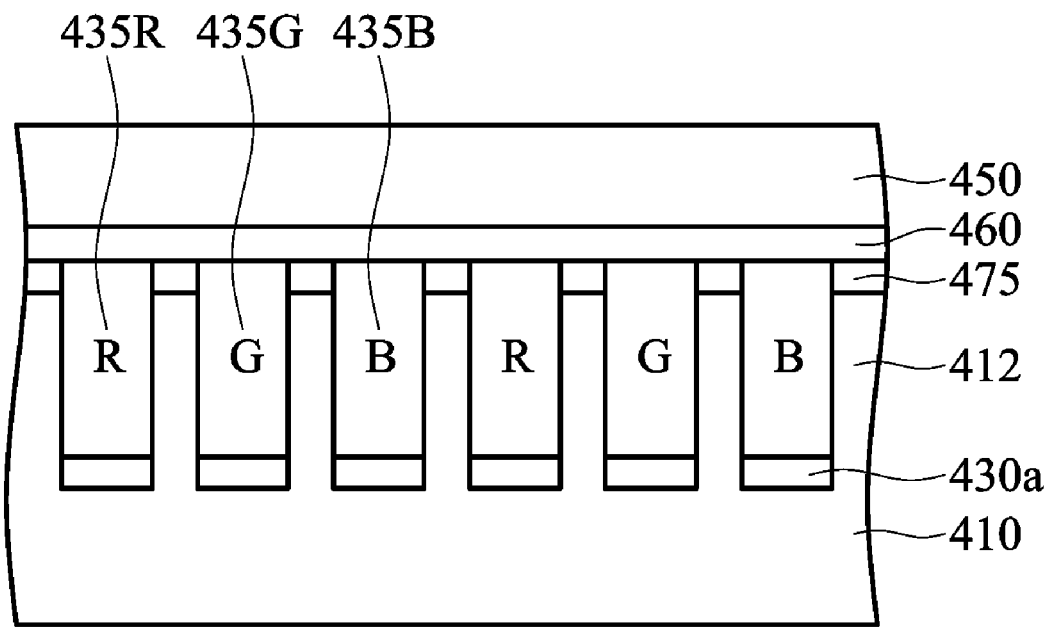

According to another embodiment of the invention, a patterned adhesion layer 475 corresponding the periodic bank portions can be optionally disposed between the bank portions 412 of the first substrate and the second substrate 450 such that the adhesion layer is tightly adhered so as to prevent LC overflow between adjacent LC channels, as shown in FIG. 6B. Since the adhesion layer is free from the areas corresponding to each of the color sub-pixel channels, driving voltages can be thus reduced and contrast ratio can be increased.

According to another embodiment of the invention, if the bank portions 412 of the first substrate are adhesive, formation of the adhesion layer on the second substrate 450 can be omitted. The bank portions of the first substrate are tightly combined with the second substrate.

Figure 6C:
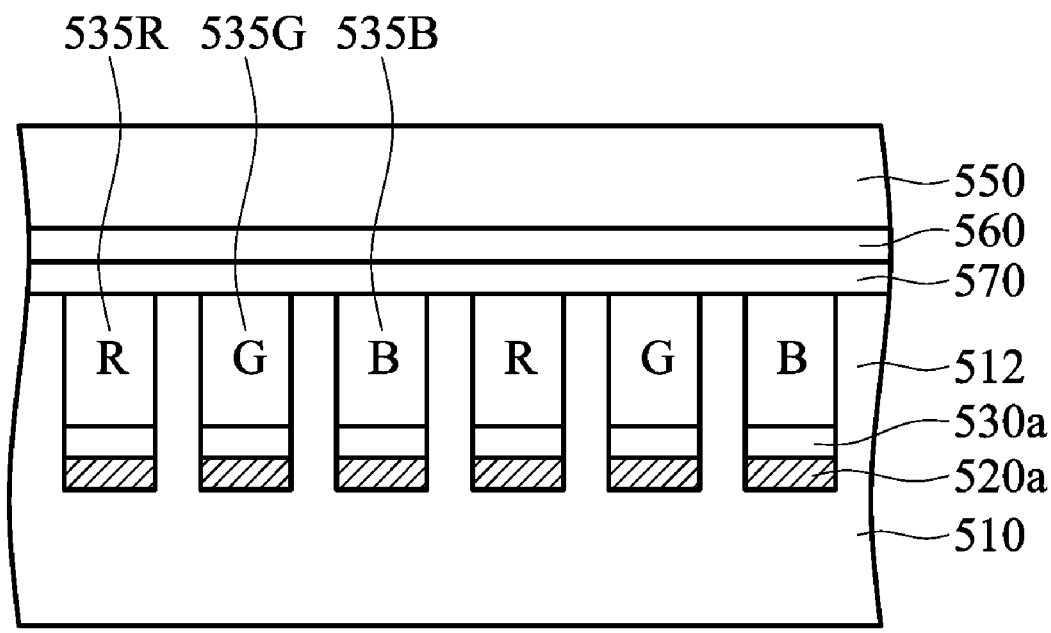

Referring to FIG. 6C, the combination of the first and second substrate structure which is filled with liquid crystal includes the first substrate and second substrate opposed to each other with a plurality of parallel LC channel for containing respective color cholesteric LCs interposed therebetween. Each LC channel corresponds to sub-pixel regions 535R, 535G, and 535B of the single layer color cholesteric LCD device. Part of remaining thin-film layer 520a and a first electrode 530a such as a pixel electrode along a first direction are disposed on the base portion 510 of the first substrate, and a second electrode 560 such as an electrode along a second direction is disposed on the second substrate 550, and the first direction and the second direction are substantially perpendicular to each other. An adhesion layer 570 can be optionally disposed between the bank portions 512 of the first substrate and the second substrate 550 such that the adhesion layer is tightly adhered so as to prevent LC overflow between adjacent LC channels during injection of color LCs.

Figure 6D:
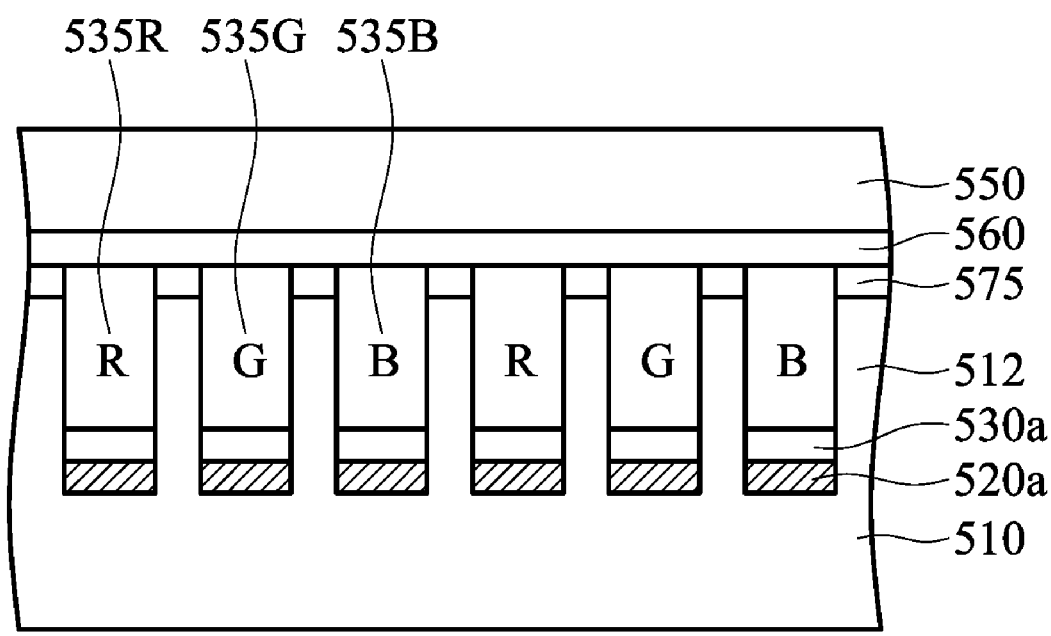

According to another embodiment of the invention, a patterned adhesion layer 575 corresponding the periodic bank portions can be optionally disposed between the bank portions 512 of the first substrate and the second substrate 550 such that the adhesion layer is tightly adhered so as to prevent LC overflow between adjacent LC channels, as shown in FIG. 6D. Since the adhesion layer is free from the areas corresponding to each of the color sub-pixel channels, driving voltages can be thus reduced and contrast ratio can be increased.

According to another embodiment of the invention, if the bank portions 512 of the first substrate are adhesive, formation of the adhesion layer on the second substrate 550 can be omitted. The bank portions of the first substrate are tightly combined with the second substrate.

Figure 7A:
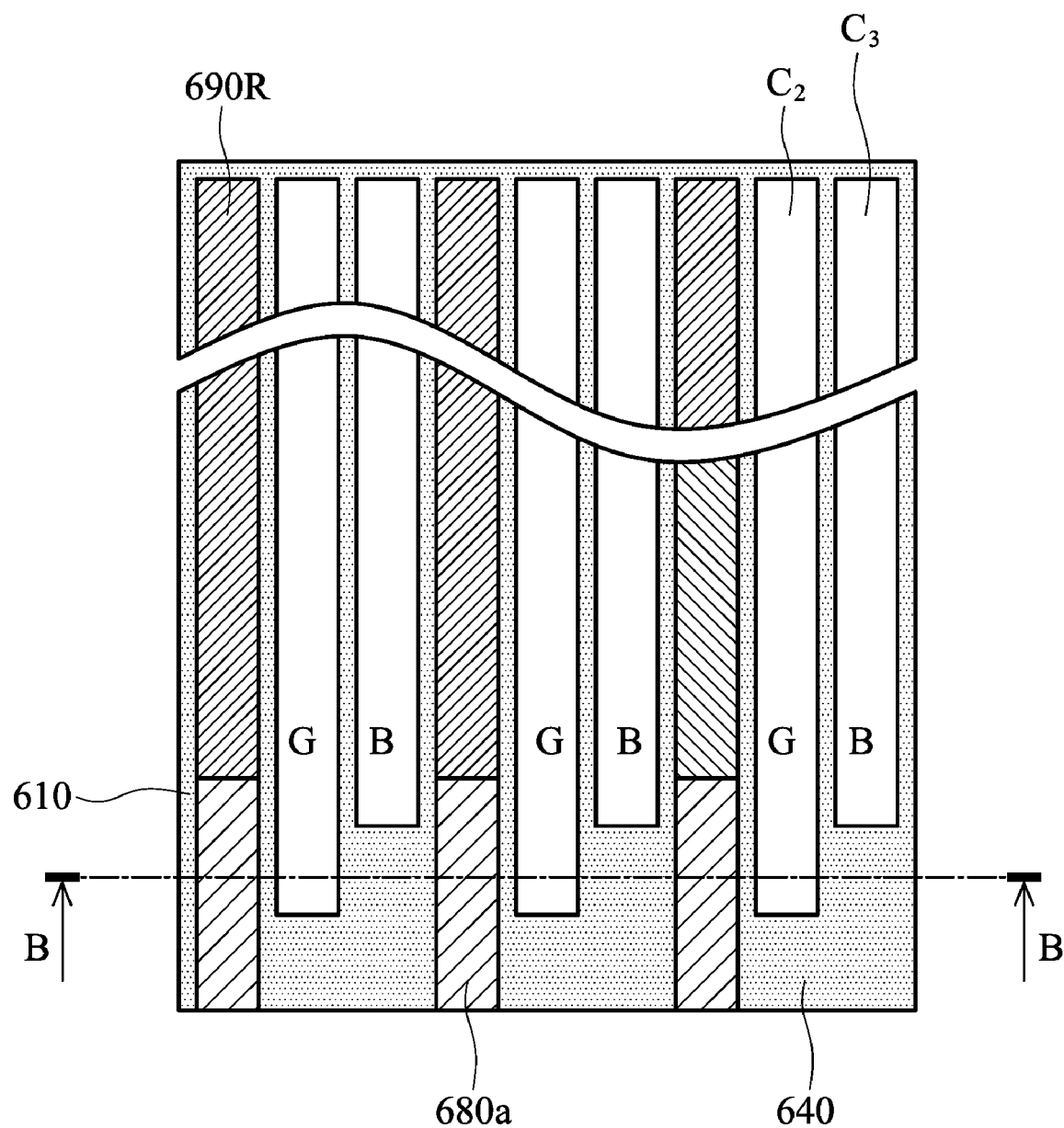
FIGS. 7A-7C are schematic views of an embodiment of each step for injecting each color LC into respective LC channels of the invention.
Figure 7B:
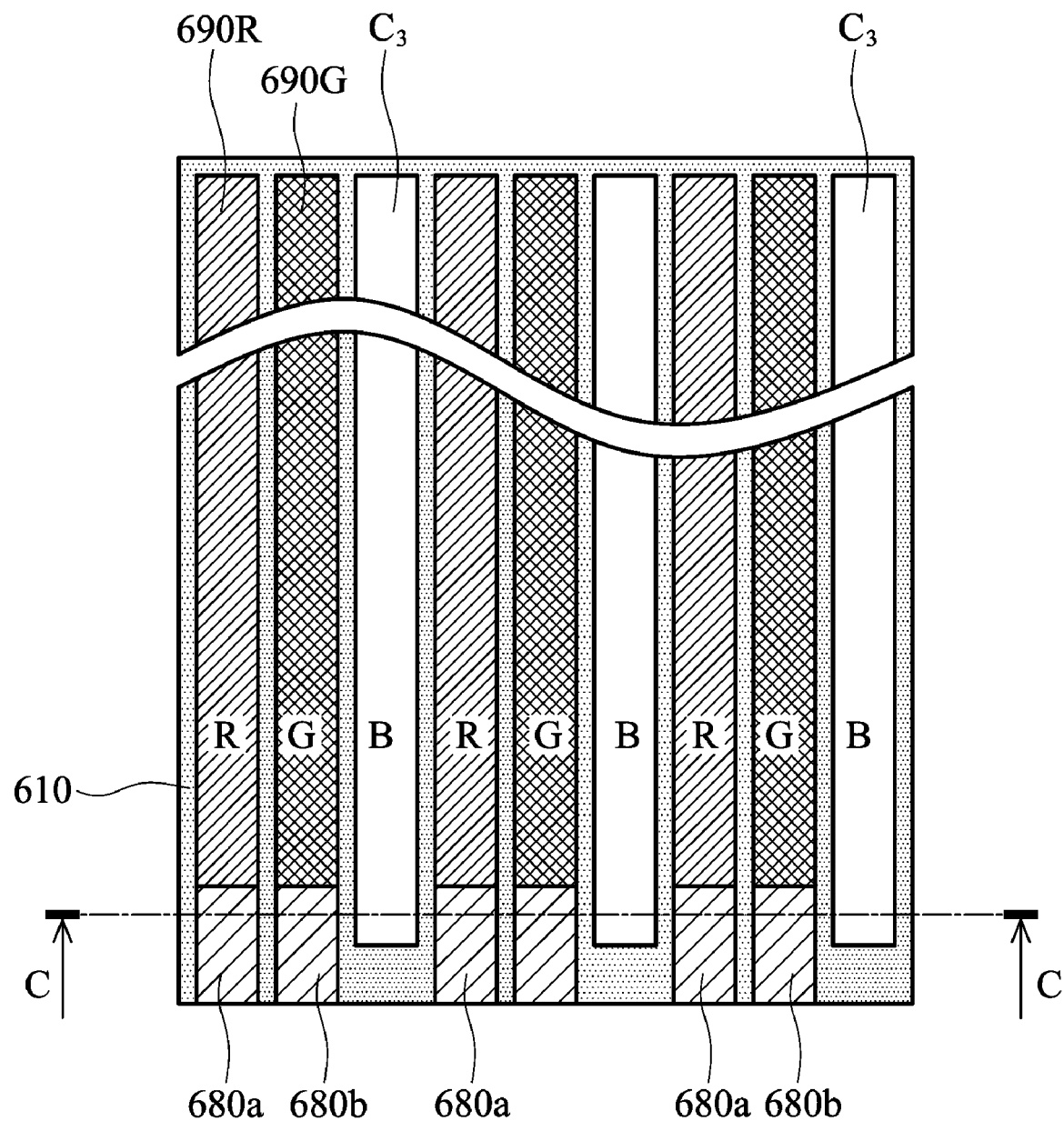
Figure 7C:
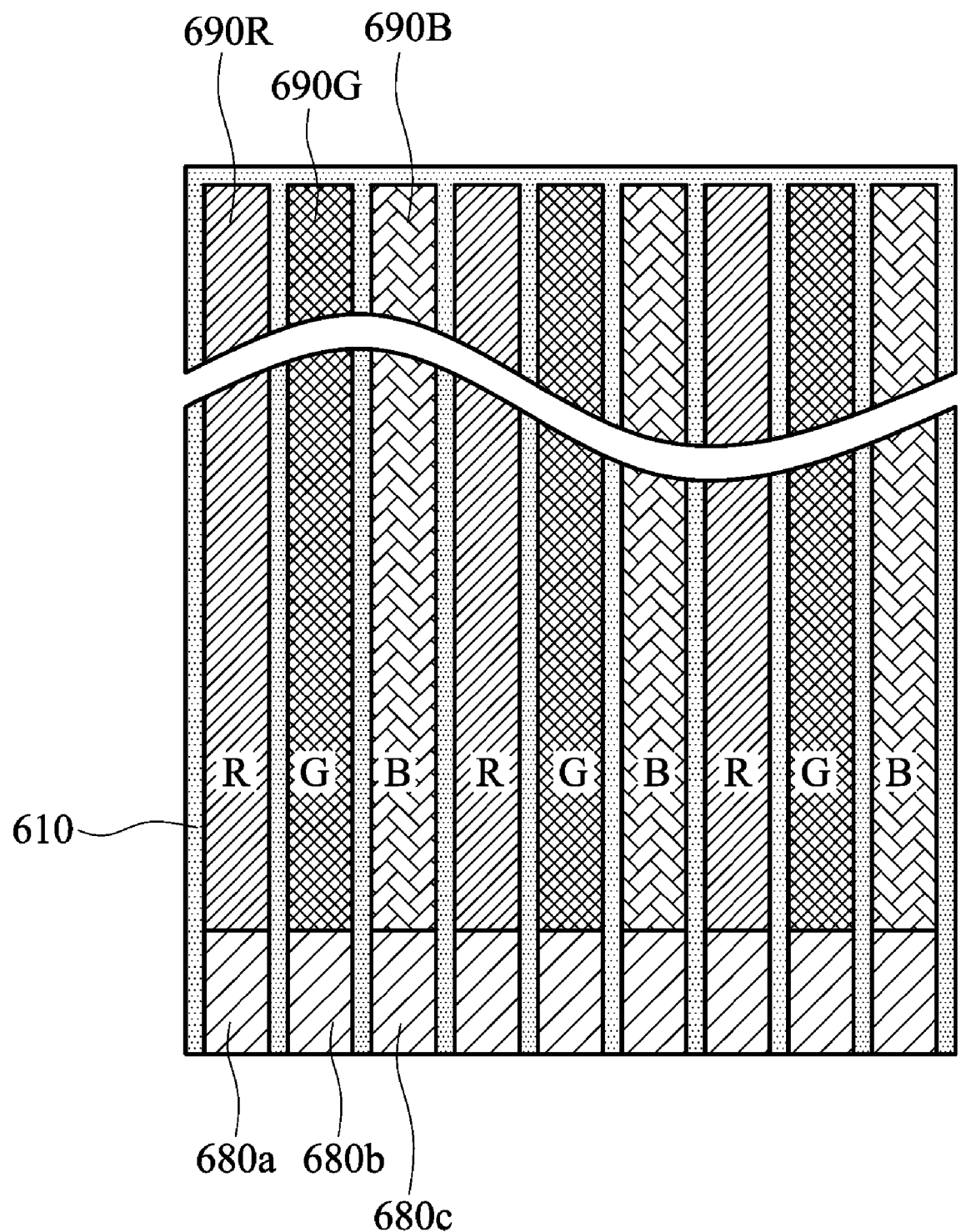

FIGS. 7A-7C are schematic views of an embodiment of each step for injecting each color LC into respective LC channels of the invention. Referring to FIG. 7A, a first color (e.g., red) cholestic LC 690R is filled into a first LC channel, and the first LC channel is then sealed by a first sealant 680a. For example, a red cholesteric CL material comprises a mixture of red dye or twisted nematic liquid crystal layer doped with chiral agent. The first sealant 680a can comprise a light solidified material or a thermoset material. Next, a first cutting procedure is performed such as cutting along line B-B to uncover the second stripe LC channel $C_2$. The first cutting procedure can be performed by dice-cutting and laser-cutting.

Referring to FIG. 7B, a second color (e.g., green) cholestic LC 690G is filled into a second LC channel, and the second LC channel is then sealed by a second sealant 680b. For example, a green cholesteric CL material comprises a mixture of green dye or twisted nematic liquid crystal layer doped with chiral agent. The second sealant 680b can comprise a light solidified material or a thermoset material. Next, a second cutting procedure is performed such as cutting along line C-C to uncover the third stripe LC channel $C_3$. The second cutting procedure can be performed by dice-cutting and laser-cutting.

Referring to FIG. 7C, a third color (e.g., blue) cholestic LC 690B is filled into a third LC channel, and the third LC channel is then sealed by a third sealant 680c. For example, a blue cholesteric CL material comprises a mixture of blue dye or twisted nematic liquid crystal layer doped with chiral agent. The third sealant 680c can comprise a light solidified material or a thermoset material. After all the three color cholesteric LCs are filled and sealed, fabrication of the single layer color cholesteric LCD device is completed.

While the invention has been described by way of example and in terms of the several embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A color cholesteric liquid crystal display device, comprising:
   a first substrate with a base portion and a periodic protruding bank portion;
   a second substrate opposing the first substrate to create a plurality of color sub-pixel channels;
   a thin-film layer on the base portion corresponding to a location of each of the color sub-pixel channels, wherein the thin-film layer comprises a photoresist; and
   a plurality of color cholesteric liquid crystals respectively filled in each of the color sub-pixel channels,
   wherein the base portion and the periodic protruding bank portion are a continuous unified structure.

2. The color cholesteric liquid crystal display device as claimed in claim 1, further comprising an adhesion layer disposed between the first substrate and the second substrate such that the adhesion layer is tightly adhered so as to prevent overflowing of the color cholesteric liquid crystals between adjacent color sub-pixel channels.

3. The color cholesteric liquid crystal display device as claimed in claim 1, wherein a first electrode along a first direction is disposed on the first substrate, and a second electrode along a second direction is disposed on the second substrate, and the first direction and the second direction are substantially perpendicular to each other.

4. The color cholesteric liquid crystal display device as claimed in claim 2, wherein the adhesion layer is patterned adhesion layers corresponding to the bank portion and the adhesion layer is free from the areas corresponding to each of the color sub-pixel channels to reduce driving voltages and to improve contrast ratio.

5. The color cholesteric liquid crystal display device as claimed in claim 1, wherein the plurality of color cholesteric liquid crystals comprises a red sub-pixel, a green sub-pixel, and a blue sub-pixel.

6. The color cholesteric liquid crystal display device as claimed in claim 1, wherein each color cholesteric liquid crystal layer comprises a respective color dye or a twisted nematic liquid crystal layer doped with chiral agent.

7. The color cholesteric liquid crystal display device as claimed in claim 1, wherein each color cholesteric liquid crystal layer comprises a polymer dispersed liquid crystal (PDLC).

8. The color cholesteric liquid crystal display device as claimed in claim 1, wherein the first substrate and the second substrate are made of rigid substrates or flexible substrates.

9. The color cholesteric liquid crystal display device as claimed in claim 8, wherein the flexible substrates comprise a polycarbonate (PC) substrate, a polyethersulfone (PES) substrate, a polyethylene terephthalate (PET) substrate, and a polyimide (PI) substrate.

10. The color cholesteric liquid crystal display device as claimed in claim 2, wherein the adhesion layer is made of a glue material or a solidified material.

11. The color cholesteric liquid crystal display device as claimed in claim 10, wherein the solidified material comprises a light solidified material or a thermoset material.

12. A fabrication method for a color cholesteric liquid crystal display device, comprising:
   providing a first substrate;
   forming a patterning mask layer on the first substrate;
   etching the first substrate to create a base portion and a periodic protruding bank portion;
   forming a first conductive layer on the first substrate;
   removing the mask layer and the first conductive layer thereon, leaving a first electrode on the base portion along a first direction;
   providing a second substrate with a second electrode along a second direction;
   assembling the first substrate and the second substrate to adhere the periodic protruding bank portion to the second substrate and divide a plurality of color sub-pixel channels; and
   sequentially injecting a plurality of color cholesteric liquid crystals in the corresponding color sub-pixel channels and sealing each of the color sub-pixel channels with a sealant material.

13. The fabrication method for a color cholesteric liquid crystal display device as claimed in claim 12, further comprising forming an adhesion layer on the second substrate or the periodic protruding bank portion of the first substrate.

14. The fabrication method for a color cholesteric liquid crystal display device as claimed in claim 13, wherein the adhesion layer is patterned adhesion layers corresponding to the periodic protruding bank portion and the adhesion layer is substantially free from the areas corresponding to each of the color sub-pixel channels.

15. The fabrication method for a color cholesteric liquid crystal display device as claimed in claim 12, wherein the first substrate and the second substrate are made of rigid substrates or flexible substrates.

16. The fabrication method for a color cholesteric liquid crystal display device as claimed in claim 15, wherein the flexible substrates comprise a polycarbonate (PC) substrate, a polyethersulfone (PES) substrate, a polyethylene terephthalate (PET) substrate, and a polyimide (PI) substrate.

17. The fabrication method for a color cholesteric liquid crystal display device as claimed in claim 14, wherein formation of the patterned adhesion layers includes inkjet printing or screen printing.

18. The fabrication method for a color cholesteric liquid crystal display device as claimed in claim 13, wherein the adhesion layer is made of a glue material or a solidified material.

19. The fabrication method for a color cholesteric liquid crystal display device as claimed in claim 18, wherein the solidified material comprises a light solidified material or a thermoset material.

20. A fabrication method for a color cholesteric liquid crystal display device, comprising:
   providing a first substrate;
   forming a thin-film layer on the first substrate;
   imprinting the first substrate with a template to create a base portion and a periodic protruding bank portion;
   depositing a first conductive layer on the first substrate;
   removing the thin-film layer on the periodic protruding bank portion and the first conductive layer on the thin-film layer, leaving a first electrode on the base portion along a first direction;
   providing a second substrate with a second electrode along a second direction;
   assembling the first substrate and the second substrate to adhere the periodic protruding bank portion to the second substrate and divide a plurality of color sub-pixel channels; and
   sequentially injecting a plurality of color cholesteric liquid crystals in the corresponding color sub-pixel channels and sealing each of the color sub-pixel channels with a sealant material.

21. The fabrication method for a color cholesteric liquid crystal display device as claimed in claim 20, further comprising forming an adhesion layer on the second substrate or the periodic protruding bank portion of the first substrate.

22. The fabrication method for a color cholesteric liquid crystal display device as claimed in claim 21, wherein the adhesion layer is patterned adhesion layers corresponding to the periodic protruding bank portion and the adhesion layer is substantially free from the areas corresponding to each of the color sub-pixel channels.

23. The fabrication method for a color cholesteric liquid crystal display device as claimed in claim 22, wherein formation of the patterned adhesion layers includes inkjet printing or screen printing.

24. The fabrication method for a color cholesteric liquid crystal display device as claimed in claim 20, wherein the first substrate and the second substrate are made of rigid substrates or flexible substrates.

* * * * *